United States Patent
Ahn et al.

(10) Patent No.: US 9,990,762 B2
(45) Date of Patent: Jun. 5, 2018

(54) IMAGE PROCESSING APPARATUS AND METHOD

(71) Applicant: SAMSUNG ELECTRONICS CO., LTD., Suwon-si (KR)

(72) Inventors: Minsu Ahn, Seoul (KR); Seungin Park, Yongin-si (KR); Inwoo Ha, Yongin-si (KR); Hyong Euk Lee, Suwon-si (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 238 days.

(21) Appl. No.: 14/945,753

(22) Filed: Nov. 19, 2015

(65) Prior Publication Data

US 2016/0171754 A1    Jun. 16, 2016

(30) Foreign Application Priority Data

Dec. 15, 2014  (KR) .................. 10-2014-0180266

(51) Int. Cl.
| | |
|---|---|
| *G06T 15/50* | (2011.01) |
| *G06T 15/10* | (2011.01) |
| *G06T 15/55* | (2011.01) |
| *G06T 15/80* | (2011.01) |

(52) U.S. Cl.
CPC ............ *G06T 15/506* (2013.01); *G06T 15/50* (2013.01); *G06T 15/55* (2013.01); *G06T 15/80* (2013.01)

(58) Field of Classification Search
CPC ....... G06T 15/506; G06T 15/55; G06T 15/50; G06T 15/80
See application file for complete search history.

(56) References Cited

U.S. PATENT DOCUMENTS

| | | | |
|---|---|---|---|
| 8,223,148 B1 | 7/2012 | Carr et al. | |
| 8,314,797 B1 | 11/2012 | Krishnaswamy et al. | |
| 8,542,231 B2 | 9/2013 | Kaplanyan | |
| 8,982,125 B1 * | 3/2015 | Mitev | .......... G06T 15/80 345/426 |
| 2009/0016429 A1 | 1/2009 | Kokojima et al. | |
| 2013/0120385 A1 | 5/2013 | Krishnaswamy et al. | |

FOREIGN PATENT DOCUMENTS

| | | |
|---|---|---|
| JP | 2013-138301 A | 7/2013 |
| KR | 10-2008-0078217 A | 8/2008 |
| KR | 10-2009-0009074 A | 1/2009 |
| KR | 10-2012-0078070 A | 7/2012 |
| KR | 10-1214000 B1 | 12/2012 |
| KR | 10-2013-0003376 A | 1/2013 |

OTHER PUBLICATIONS

Hăsan et al., Direct-to-Indirect Transfer for Cinematic Relighting, Dec. 2006, 1089-1097.*

* cited by examiner

*Primary Examiner* — Robert Craddock
(74) *Attorney, Agent, or Firm* — NSIP Law

(57) ABSTRACT

An image processing apparatus includes a calculator configured to calculate a first difference value between frames in terms of either one or both of a position and a direction of a direct light by comparing a current frame to at least one previous frame, and a determiner configured to determine that an indirect light of the current frame is to be sampled in response to the first difference value being greater than or equal to a threshold.

20 Claims, 11 Drawing Sheets i-1 Frame i Frame

IMAGE PROCESSING APPARATUS AND METHOD

CROSS-REFERENCE TO RELATED APPLICATION(S)

This application claims the benefit under 35 USC 119(a) of Korean Patent Application No. 10-2014-0180266 filed on Dec. 15, 2014, in the Korean Intellectual Property Office, the entire disclosure of which is incorporated herein by reference for all purposes.

BACKGROUND

1. Field

This application relates to a rendering field that provides global illumination effects or indirect illumination effects.

2. Description of Related Art

In various fields, for example, three-dimensional (3D) games, virtual reality animations, and movies, an interest in real-time rendering of a 3D model is increasing. When a 3D scene is rendered using global illumination technology, virtual point lights (VPLs) that represent indirect illumination effects, for example, diffraction and reflection of light in an image space, may be sampled. In some cases, a number of such VPLs may be sampled, which increases a computational complexity for a visibility check and shading in a rendering process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing apparatus includes a calculator configured to calculate a first difference value corresponding to a difference between frames in terms of either one or both of a position and a direction of a direct light by comparing a current frame to at least one previous frame; and a determiner configured to determine that an indirect light of the current frame is to be sampled in response to the first difference value being greater than or equal to a threshold.

The indirect light may include a virtual point light (VPL).

The calculator may be further configured to compare a first area corresponding to the position and the direction of the direct light in the at least one previous frame to a second area corresponding to the position and the direction of the direct light in the current frame, and calculate a non-overlapping area ratio between the first area and the second area as the first difference value.

The determiner may be further configured to compare, in response to the first difference value being less than the threshold, the first difference value to an indirect light sampling interval of the at least one previous frame, and determine that the indirect light of the current frame is to be sampled in response to the first difference value being greater than or equal to the indirect light sampling interval.

The indirect light sampling interval may be an average sampling interval of indirect lights sampled in the at least one previous frame.

The indirect light sampling interval may be a minimum sampling interval of indirect lights sampled in the at least one previous frame.

The apparatus may further include a sampler configured to sample the indirect light of the current frame by performing rendering from a point of view of the direct light of the current frame in response to the determiner determining that the indirect light of the current frame is to be sampled, and update the indirect light sampled in the at least one previous frame as the indirect light of the current frame in response to the determiner not determining that the indirect light of the current frame is to be sampled.

The sampler may be further configured to perform the sampling in parallel with a shader configured to perform shading using either one or both of the direct light and the indirect light.

In another general aspect, an image processing apparatus includes a calculator configured to calculate a first difference value corresponding to a difference between frames in terms of either one or both of a position and a direction of a direct light by comparing a current frame to at least one previous frame; and a determiner configured to determine that at least one indirect light sampled in the at least one previous frame is to be reused as an indirect light of the current frame in response to the first difference value being less than a first threshold.

The determiner may be further configured to compare, in response to the first difference value being less than the first threshold, the first difference value to an indirect light sampling interval of the at least one previous frame, and determine that the indirect light of the current frame is to be sampled in response to the first difference value being greater than or equal to the indirect light sampling interval.

The determiner may be further configured to determine that the indirect light of the current frame is to be sampled, rather than reusing the at least one indirect light as the indirect light of the current frame, in response to a number of consecutive frames in which the at least one indirect light has been reused as the indirect light of the current frame being greater than or equal to a second threshold despite the first difference value being less than the first threshold.

The determiner may be further configured to determine that the indirect light of the current frame is to be sampled, rather than reusing the at least one indirect light as the indirect light of the current frame, in response to a variation in shape information of an area corresponding to the position and the direction of the direct light in the at least one previous frame being greater than or equal to a third threshold despite the first difference value being less than the first threshold.

The shape information may include information on a normal of an object surface corresponding to the area.

In another general aspect, an image processing method of an image processing apparatus including computing hardware includes calculating, using the computing hardware, a first difference value corresponding to a difference between frames in terms of either one or both of a position and a direction of a direct light by comparing a current frame to at least one previous frame; and determining, using the computing hardware, that at least one indirect light sampled in the at least one previous frame is to be reused as an indirect light of the current frame in response to the first difference value being less than a first threshold.

The method may further include updating the indirect light sampled in the at least one previous frame as the indirect light of the current frame in response to a result of the determining being that the at least one indirect light is to be reused as the indirect light of the current frame, and sampling the indirect light of the current frame by performing rendering from a point of view of the direct light of the current frame in response to a result of the determining not being that the at least one indirect light is to be reused as the indirect light of the current frame.

The comparing may include comparing a first area corresponding to the position and the direction of the direct light in the at least one previous frame to a second area corresponding to the position and the direction of the direct light in the current frame; and the first difference value may include a non-overlapping area ratio between the first area and the second area.

The method may further include comparing, in response to the first difference value being less than the first threshold, the first difference value to an indirect light sampling interval of the at least one previous frame, and determining that the indirect light of the current frame is to be sampled in response to the first difference value being greater than or equal to the indirect light sampling interval.

The determining may include determining that the indirect light of the current frame is to be sampled, rather than reusing the at least one indirect light as the indirect light of the current frame, in response to a number of consecutive frames in which the at least one indirect light has been reused as the indirect light of the current frame being greater than or equal to a second threshold despite the first difference value being less than the first threshold.

The determining may include determining that the indirect light of the current frame is to be sampled, rather than reusing the at least one indirect light as the indirect light of the current frame, in response to a variation in shape information of an area corresponding to the position and the direction of the direct light in the at least one previous frame being greater than or equal to a third threshold despite the first difference value being less than the first threshold.

In another general aspect, a non-transitory computer-readable storage medium stores instructions to cause computing hardware to perform the method described above.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terms used herein are mainly selected from general terms currently being used in light of functions described in this application. However, other terms may be used based on the development and/or changes in technology, a custom, or a preference of an operator. Thus, it should be understood that the terms used herein are merely terms used to describe examples, rather than terms that limit the spirit and scope of this application.

In addition, in a specific case, most appropriate terms have been arbitrarily selected by the applicants for ease of description and/or ease of understanding. In this instance, the meanings of the arbitrarily used terms will be clearly explained in the corresponding description. Hence, the terms should be understood not by the simple names of the terms, but by the meanings of the terms and the following overall description of this specification.

Figure 1:
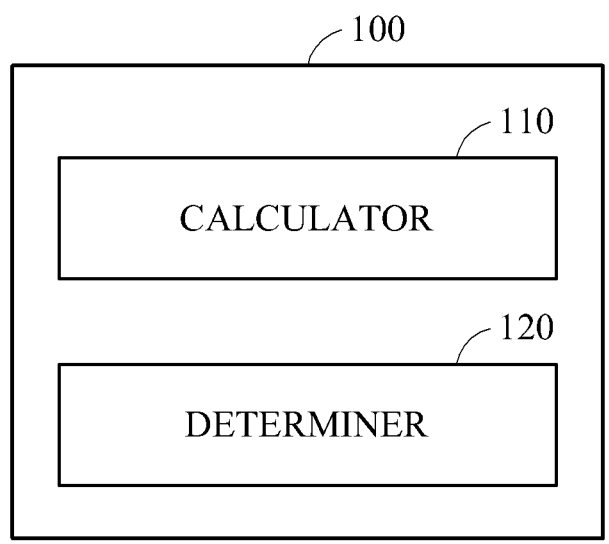
FIG. 1 is a block diagram illustrating an example of an image processing apparatus.

FIG. 1 is a block diagram illustrating an example of an image processing apparatus.

Referring to FIG. 1, an image processing apparatus 100 includes a calculator 110 and a determiner 120. The image processing apparatus 100 determines whether an indirect light, for example, a virtual point light (VPL), is to be sampled from a direct light. The image processing apparatus 100 determines, based on a temporal coherency or a temporal locality, whether the VPL is to be sampled from the direct light in a current frame, or at least a portion of VPLs sampled in a previous frame are to be reused.

The calculator 110 compares the current frame to at least one previous frame. In the comparing, a variation in either one or both of a position and a direction of the direct light in response to a frame change is calculated. The variation is referred to as a first difference value.

The calculator 110 compares a first area corresponding to the position and the direction of the direct light in the at least one previous frame to a second area corresponding to the position and the direction of the direct light in the current frame. The calculator 110 calculates a non-overlapping ratio between the first area and the second area as the first difference value. In one example, the ratio is an area ratio of a non-overlapping portion to the first area or the second area. This example will be described in detail with reference to FIGS. 4A and 4B.

The determiner 120 determines whether the VPL is to be re-sampled from the direct light in the current frame, or at least a portion of the VPLs sampled in the previous frame are to be reused. When the first difference value is greater than or equal to a first threshold, the determiner 120 determines that the VPL is to be re-sampled from a point of view of the direct light in the current frame, rather than reusing the VPL of the previous frame. Conversely, when the first difference value is less than the first threshold, the determiner 120 determines that at least a portion of the VPLs sampled in the previous frame are to be reused as the indirect light of the current frame.

In another example, when the first difference value is less than the first threshold, the determiner 120 performs an additional determination, rather than immediately determining that the VPL sampled in the previous frame is to be reused. In this example, the determiner 120 compares the first difference value to a sampling interval of the VPLs sampled in the previous frame. As a result of the comparing, when the first difference value is greater than or equal to the sampling interval, the determiner 120 determines that the VPL of the current frame is to be re-sampled, rather than reusing the VPL sampled in the previous frame. For example, but not limited thereto, the sampling interval may be an average sampling interval of the VPLs sampled in the previous frame. However, the foregoing is provided as an example only. For example, the sampling interval may be a minimum value of the sampling interval of the VPLs sampled in the previous frame.

Hereinafter, further examples of the additional determination are provided. In one example, the determiner 120 may additionally considers a VPL reuse count between frames. When a number of consecutive frames in which the VPL of the previous frame has been reused in the current frame, for example, the VPL reuse count, is greater than or equal to a second threshold despite the first difference value being less than the first threshold, the determiner 120 determines that the VPL of the previous frame is not to be reused. In another example, the determiner 120 considers a variation in object shape information of a three-dimensional (3D) model in which a VPL is to be sampled. When the variation in the shape information of the 3D model is greater than or equal to a third threshold, the determiner 120 determines that the VPL of the previous frame is not to be reused as the VPL of the current frame despite the first difference value being less than the first threshold. For example, but not limited thereto, the shape information may include information on a normal of an object surface in an area corresponding to the position and/or the direction of the direct light. In detail, the shape information may be an average of an object surface normal distribution. When the determiner 120 determines that the indirect light is not to be reused, the VPL is sampled based on the position of the direct light in the current frame. For example, the 3D model is rendered from a point of view of the direct light in the current frame, and the VPL is sampled based on a result of the rendering.

Figure 2A:
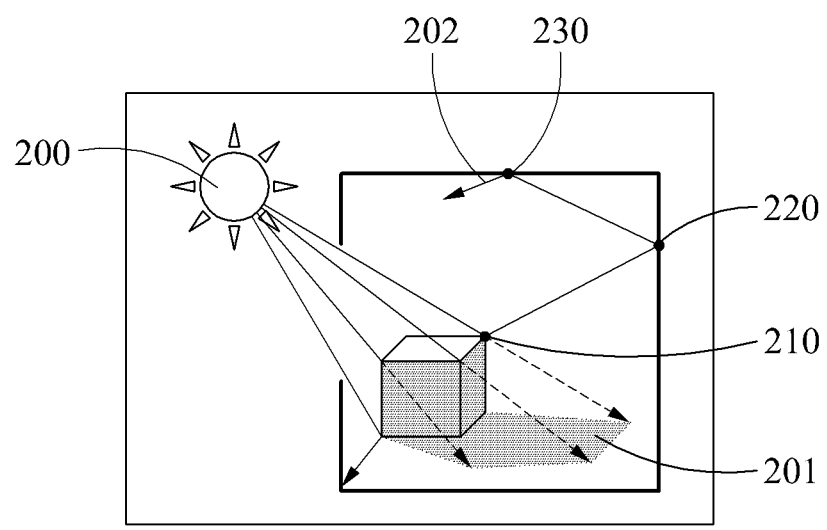
FIGS. 2A through 2C are diagrams illustrating an example of a process of sampling an indirect light based on a position of a direct light.
Figure 2B:
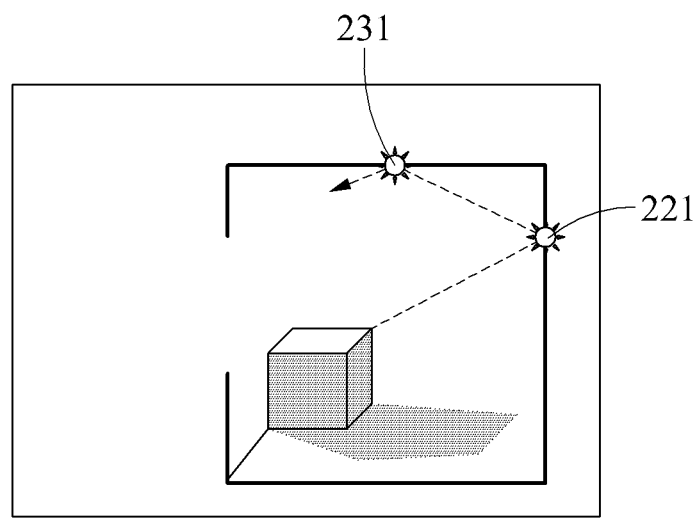
Figure 2C:
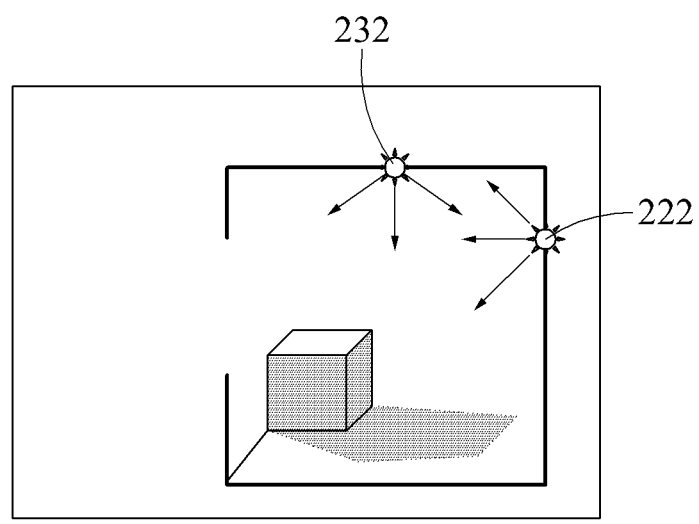

FIGS. 2A through 2C are diagrams illustrating an example of a process of sampling an indirect light based on a position of a direct light.

Referring to FIGS. 2A through 2C, a portion 201 with no visibility by a direct light 200 is indicated by a shadow. VPLs may be sampled to enable a soft shadow by expressing phenomena, for example, diffraction, reflection, and refraction of light in the portion 201. For example, VPLs are sampled at points 210, 220, and 230 at which a ray 202 departing from the direct light 200 is reflected as it proceeds. For example, VPLs 221 and 231 are sampled as shown in FIG. 2B. As shown in FIG. 2C, global illumination rendering, for example, a radiosity rendering, is performed by applying color values of such VPLs 222 and 232 affecting an object area. In the foregoing process, a quality of rendering increases as a number of VLPs to be sampled increases. However, operating resources are used in the process of sampling the VPLs and the process of performing radiosity rendering based on the sampled VPLs. Thus, a reduction in an unnecessary redundancy in sampling of the VPLs is necessary. In one example, VPLs are reused between frames based on a temporal coherency or a temporal locality indicating that a position and/or a direction of a direct light has not changed greatly between adjacent frames despite a frame change over time. VPL sampling and a reuse thereof will be described in detail with reference to FIG. 3 and subsequent drawings.

Figure 3:
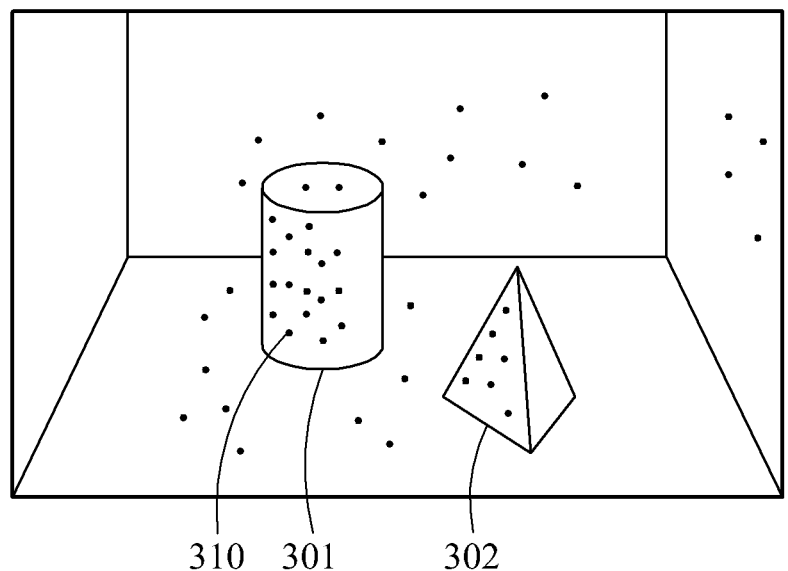
FIG. 3 illustrates an example of indirect lights to be sampled.

FIG. 3 illustrates an example of indirect lights to be sampled.

Referring to FIG. 3, a 3D model 300 in which multiple VPLs are sampled from a direct light in an (i−1)-th frame is illustrated. VPLs are sampled on an object 301 and an object 302. Such VPLs including a VPL 310 may be sampled based on importance. A position and/or a direction of the direct light in an i-th frame is compared to those of the direct light in the (i−1)-th frame. In a case in which changes in relative positions and/or directions of the direct light and the objects 301 and 302 of the 3D model 300 are negligible, a result of sampling such VPLs is reused in the i-th frame. In one example, a variation in a position and/or a direction of a direct light between different frames, and whether at least a portion of VPLs sampled in a previous frame are reusable, are determined. Such a determination method will be described in detail.

Figure 4A:
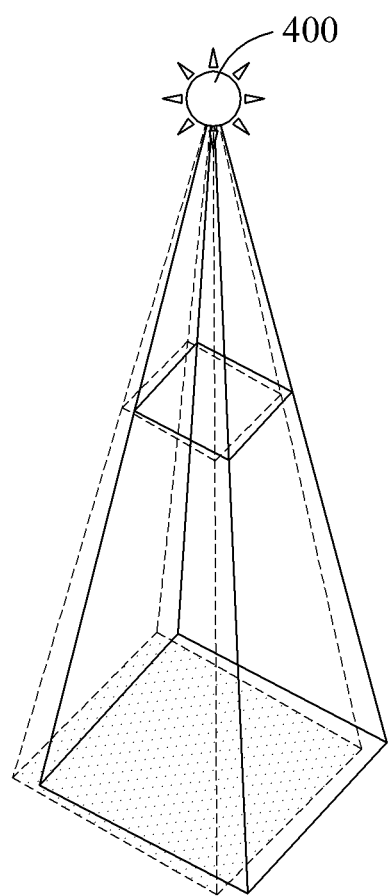
FIGS. 4A and 4B are diagrams illustrating an example of a process of determining whether an indirect light is to be sampled in a current frame.
Figure 4A:
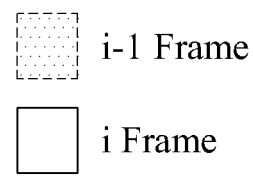
Figure 4B:
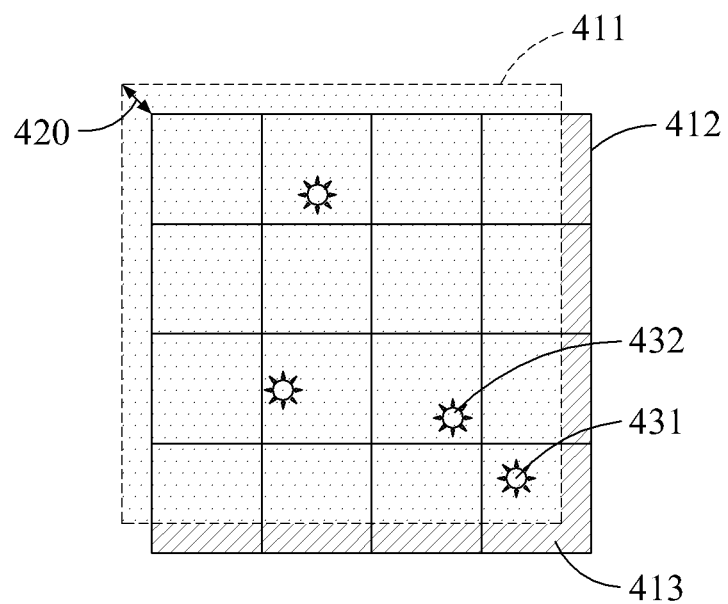

FIGS. 4A and 4B are diagrams illustrating an example of a process of determining whether an indirect light is to be sampled in a current frame.

In FIG. 4A, an influence range of a direct light 400 with respect to a position and/or a direction of the direct light 400 is illustrated as a frustum. The influence range of the direct light 400 in an (i−1)-th frame is indicated with broken lines, and the influence range of the direct light 400 in an i-th frame is indicated with solid lines. Such influence ranges may not be all object spaces reached by the direct light 400. The influence ranges may be virtual ranges set to compare positions and directions of the direct light 400, and may be provided in a random shape, for example, a sphere, a hemisphere, a cylinder, or a cone, rather than a frustum as illustrated in FIG. 4A. Further, in lieu of such virtual influence ranges, a representative vector that represents the position and the direction of the direct light may be used. A process of determining whether a VPL of a previous frame is to be reused will be described with reference to FIG. 4B. For such a determination, a first difference value corresponding to a difference in a position and/or a direction of a direct light between frames is compared to a first threshold. Various examples of the first difference value may be used.

Referring to FIG. 4B, an influence range 411 of a direct light in a previous frame, for example, an (i−1)-th frame, is compared to an influence range 412 of the direct light in a current frame, for example, an i-th frame. A variation in the influence range of the direct light is the first difference value. In detail, in one example, an area ratio of a portion 413 not overlapping the influence range 411 of the previous frame to the influence range 412 of the current frame is the first difference value. When the first difference value corresponding to a ratio of the non-overlapping portion 413 to the entire area is greater than or equal to a first threshold, a result of sampling a VPL in the previous frame is not reused, and a VPL is re-sampled in the current frame. The first threshold may be set to a value, for example, 5%. The first threshold may not be fixed to a single value, but may adaptively change.

In another example, a distance variation 420 between the influence range 412 of the current frame and the influence range 411 of the previous frame is the first difference value.

In this example, the first difference value is compared to an interval between VPLs sampled in the previous frame, for example, VPLs 431 and 432. For example, the interval may be an average interval or a minimum interval between the VPLs.

The process of determining whether the indirect light is to be sampled in the current frame may be performed in two operations. In one operation, the first difference value corresponding to the ratio of the non-overlapping portion 413 to the entire area is compared to the first threshold. When the first difference value is greater than or equal to the first threshold, the VPL is determined to be re-sampled in the current frame, rather than reusing the result of sampling the VPL in the previous frame. Conversely, when the first difference value is less than the first threshold, an additional determination is performed in the other operation. In the other operation, an interval between VPLs is compared to the first difference value corresponding to the distance variance 420 in the influence range between frames. The interval between the VPLs may be a minimum interval or an average interval. When the first difference value is greater than or equal to the interval between the VPLs, the VPL is determined to be re-sampled in the current frame, rather than reusing the result of sampling the VPL in the previous frame. Conversely, when the first difference value is less than the interval between the VPLs, the result of sampling the VPL in the previous frame is determined to be reused in the current frame.

Hereinafter, further examples of the other operation will be suggested. In the determining process, a VPL reuse count between frames is additionally considered. For example, when a number of consecutive frames in which the VPL of the previous frame has been reused in the current frame, for example, the VPL reuse count, is greater than or equal to a second threshold despite the first difference value being less than the first threshold, the VPL is determined to be re-sampled in the current frame, rather than reusing the result of sampling the VPL in the previous frame. That is because a possibility of errors increases when the number of the frames in which the VPLs are reused is greater than or equal to the second threshold. The second threshold may be set to be a value, for example, "3".

Further, in another example, a variation in object shape information of a 3D model in which a VPL is to be sampled is considered. When the variation in the shape information of the 3D model is greater than or equal to a third threshold, the VPL of the current frame is determined to be newly sampled, rather than reusing the VPL of the previous frame as the VPL of the current frame. As described above, the shape information may be information on a normal of an object surface corresponding to an influence range of a direct light. For example, an average of a surface normal distribution may be considered as the shape information.

In an example in which rendering associated with an image processing apparatus is tile-based deferred rendering, such a determination may be performed for each individual tile. For example, whether a VPL is to be re-sampled from a direct light may be determined with respect to a predetermined tile based on an interval between VPLs within the corresponding tile.

Figure 5:
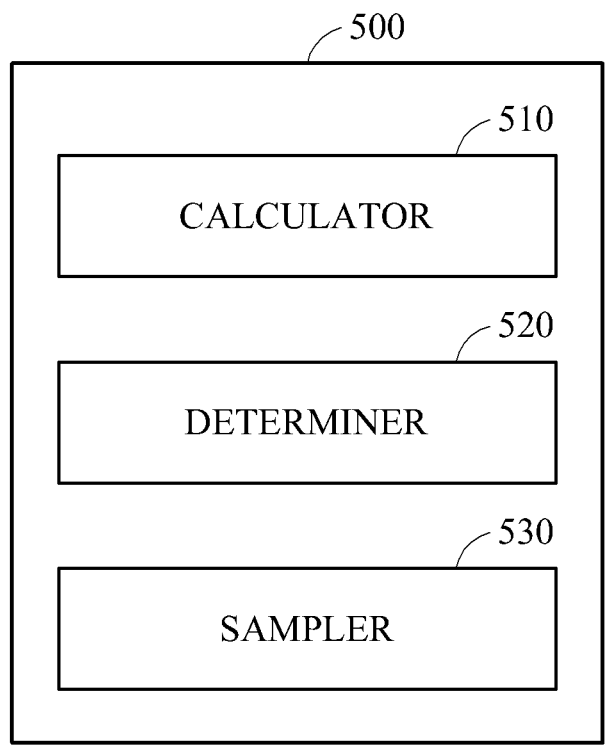
FIG. 5 is a block diagram illustrating an example of an image processing apparatus.

FIG. 5 is a block diagram illustrating an example of an image processing apparatus.

Referring to FIG. 5, an image processing apparatus 500 includes a calculator 510, a determiner 520, and a sampler 530. The calculator 510 calculates a first difference value corresponding to a difference between an influence range of a direct light in a previous frame and an influence range of the direct light in a current frame. As described above, the first difference value may be an area ratio of a portion in which the influence ranges of the direct light do not overlap between the previous frame and the current frame. The descriptions provided with reference to FIGS. 4A and 4B are applicable to the foregoing process. Thus, duplicated descriptions have been omitted for conciseness.

The determiner 520 determines whether a VPL is to be re-sampled from the direct light in the current frame, or at least a portion of VPLs sampled in the previous frame are to be reused. As described with reference to FIGS. 1 through 4B, when the first difference value is greater than or equal to a first threshold, the determiner 520 determines that the VPL is to be re-sampled from a point of view of the direct light in the current frame, rather than reusing the VPL of the previous frame. Conversely, when the first difference value is less than the first threshold, the determiner 520 determines that at least a portion of the VPLs sampled in the previous frame is to be reused as the indirect light of the current frame.

Further, when the first difference value is less than the first threshold, the determiner 520 may additionally determine whether the VPL sampled in the previous frame is to be reused. For example, the determiner 520 may further compare the first difference value to a sampling interval between the sampled VPLs. Detailed descriptions thereof are described with reference to FIG. 4B. In addition, in such a determination, a VPL reuse count between frames, and/or a variation in object shape information within the influence range of the direct light, may be considered. The shape information may be, for example, an average of an object surface normal distribution.

The sampler 530 either samples the VPL of the current frame based on the determination of the determiner 520, or reuses at least a portion of the VPLs sampled in the previous frame as the VPL of the current frame. In this example, "reusing" refers to "updating" the at least a portion of the VPLs sampled in the previous frame as the VPL of the current frame, in lieu of sampling the VPL of the current frame. An operation performed by the sampler 530 to sample the VPL may be processed in parallel with an operation of a shader (not shown) to render a scene using a direct light and an indirect light, whereby, for example, but not limited thereto, acceleration of hardware such as a graphics processing unit (GPU), for example, may be enabled. Further, the determination of the determiner 520 regarding whether the VPL is to be sampled in the current frame may be performed by a central processing unit (CPU), whereby efficient resource distribution and rapid processing may be enabled.

Figure 6:
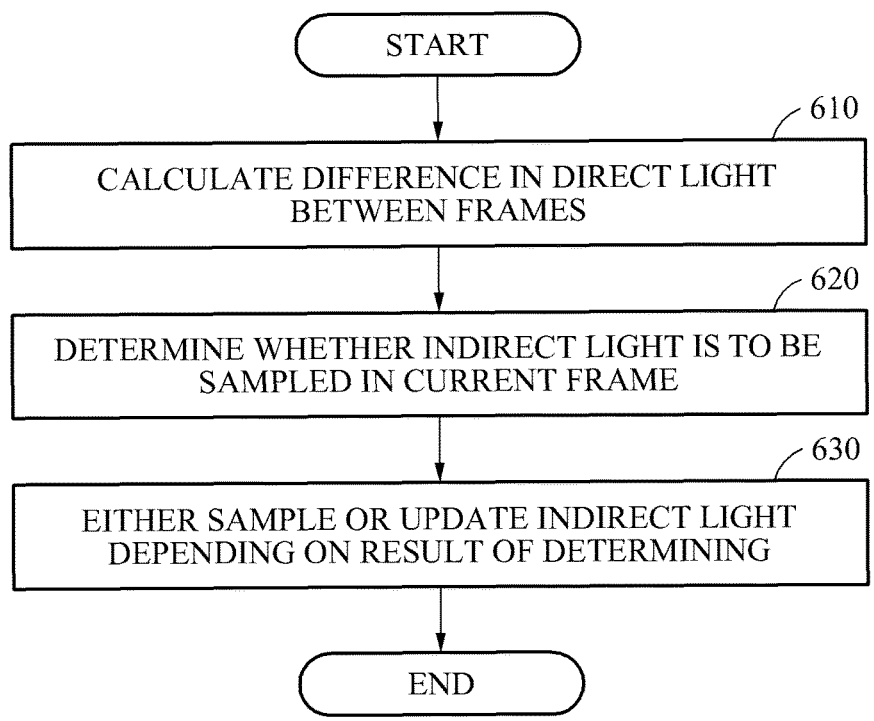
FIGS. 6 through 8 are flowcharts illustrating examples of an image processing method.

FIG. 6 is a flowchart illustrating an example of an image processing method.

Referring to FIG. 6, in operation 610, a direct light of a current frame is compared to a direct light of at least one previous frame. When there are a plurality of direct lights, direct lights having a same index are compared to each other. In the comparing process, a variation in either one or both of a position and a direction of the direct light in response to a frame change are compared. The variation is referred to as a first difference value. In one example, the first difference value is a area ratio of a portion in which an influence range of the direct light in the previous frame and an influence range of the direct light in the current frame do not overlap and are misaligned.

In operation 620, whether a VPL is to be re-sampled from the direct light in the current frame, or at least a portion of VPLs of the previous frame are to be reused, is determined.

The first difference value calculated in operation 610 is compared to a first threshold. The first threshold may be an area ratio, for example, 5%. In operation 620, another determination may be additionally performed. For example, as described above, a distance variation in the position/direction of the direct light between frames may be compared to a sampling interval between VPLs. When the distance variation is greater than or equal to the sampling interval between the VPLs, VPLs are determined to be re-sampled in the current frame. Conversely, when the distance variation is less than the sampling interval between the VPLs, the VPLs are determined to be reused. In this process, a VPL reuse count between frames may be considered. When a number of consecutive frames in which a VPL has been reused is greater than or equal to a second threshold, the VPL of the previous frame is determined not to be reused. Further, when a variation in object shape information of a 3D model, for example, a surface normal information, is greater than or equal to a third threshold, the VPL of the previous frame is determined not to be reused.

In operation 630, based on a result of the determining, either the VPL of the current frame is sampled, or at least a portion of the VPLs sampled in the previous frame are reused as the VPL of the current frame. In this example, "reusing" is "updating" the at least a portion of the VPLs sampled in the previous frame as the VPL of the current frame in lieu of sampling the VPL of the current frame.

Figure 7:
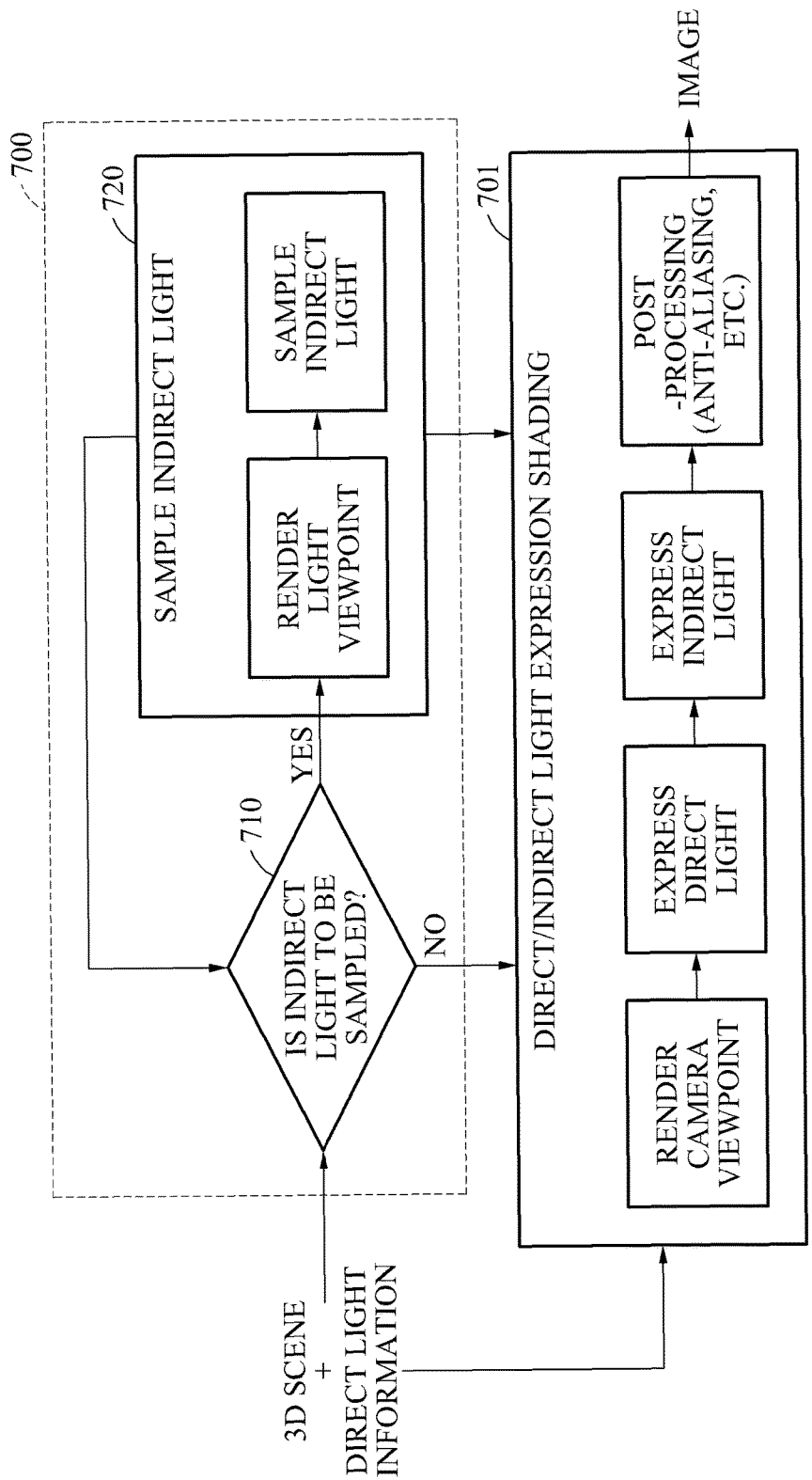

FIG. 7 illustrates another example of an image processing method 700 contributing to radiosity rendering. When a 3D scene and direct light information are input, the image processing method 700 determines whether a VPL sampled in a previous frame is to be reused in a current frame as described above. As shown in FIG. 7, in a shading process 701, shading by a direct light and shading by an indirect light are performed. In response to a determination of operation 710 regarding whether a VPL of the current frame is to be sampled, operation 720 of sampling the indirect light is performed, or operation 720 is omitted and the VPL of the previous frame is reused. When operation 720 is omitted, a corresponding computational complexity is reduced. When sampling is performed in operation 720 because it is determined in operation that sampling of the indirect light is to be performed, such sampling may be performed in parallel with the shading process 701, which is advantageous to high-speed parallel processing by a GPU.

Figure 8:
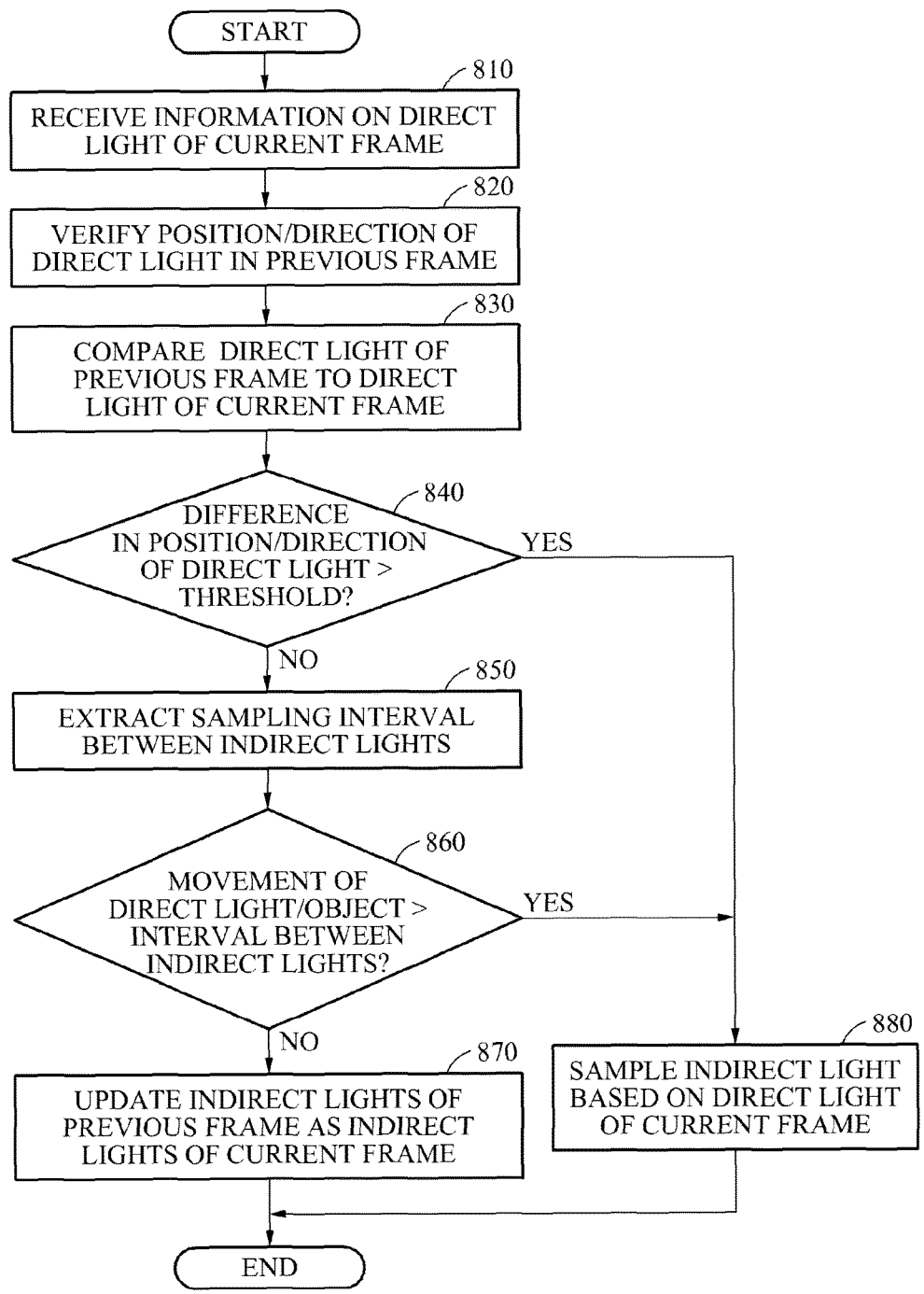

FIG. 8 is a flowchart illustrating another example of an image processing method.

Referring to FIG. 8, in operation 810, information on a direct light of a current frame is received. In operation 820, a position and/or a direction of a direct light having a same index in a previous frame is verified. Referring to FIG. 5 together with FIG. 8, the calculator 510 compares positions/directions of the direct light between the previous frame and the current frame in operation 830. Such a difference is a first difference value as described above. In operation 840, the first difference value is compared to a first threshold. When the first difference value is a variation in an influence range of the direct light, the first threshold may be a predetermined area ratio. In the foregoing example, the first difference value corresponding to an area ratio of a portion not overlapping an influence range of the previous frame to an influence range of the current frame is compared to the first threshold, for example, an area ratio of 5%. When the first difference value is greater than the first threshold in operation 840, a VPL of the current frame is re-sampled based on the direct light of the current frame in operation 880.

Conversely, when the first difference value is less than the first threshold, a sampling interval between indirect lights is extracted in operation 850. The interval at which VPLs are sampled, for example, a minimum interval or an average interval, is described with reference to FIG. 4B. In operation 860, whether a movement of the direct light or an object is greater than the VPL sampling interval is determined. When a variation in the position/direction of the direct light or a variation in shape information is greater than the VPL sampling interval, the VPL is sampled in the current frame in operation 880. However, when the variation in the position/direction of the direct light or the object shape information is less than the sampling interval between the VPLs, VPLs of the previous frame are determined to be reusable. In operation 870, the VPLs of the previous frame are updated as the VPLs of the current frame, and the sampling process is omitted. The descriptions provided with reference to FIGS. 4A through 7 are applicable to the image processing method of FIG. 8, and thus duplicated descriptions have been omitted for conciseness.

The calculator 110 and the determiner 120 in FIG. 1 and the calculator 510, the determiner 520, and the sampler 530 in FIG. 5 that perform the operations described herein with respect to FIGS. 1-8 are implemented by hardware components. Examples of hardware components include controllers, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 6-8 that perform the operations described herein with respect to FIGS. 1-8 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing apparatus comprising:
   a calculator configured to calculate a first difference value corresponding to a difference between frames in terms of either one or both of a position and a direction of a direct light by comparing a current frame to at least one previous frame; and
   a determiner configured to determine that an indirect light of the current frame is to be sampled in response to the first difference value being greater than or equal to a threshold.

2. The apparatus of claim 1, wherein the indirect light comprises a virtual point light (VPL).

3. The apparatus of claim 1, wherein the calculator is further configured to compare a first area corresponding to the position and the direction of the direct light in the at least one previous frame to a second area corresponding to the position and the direction of the direct light in the current frame, and calculate a non-overlapping area ratio between the first area and the second area as the first difference value.

4. The apparatus of claim 1, wherein the determiner is further configured to compare, in response to the first difference value being less than the threshold, the first difference value to an indirect light sampling interval of the at least one previous frame, and determine that the indirect light of the current frame is to be sampled in response to the first difference value being greater than or equal to the indirect light sampling interval.

5. The apparatus of claim 4, wherein the indirect light sampling interval is an average sampling interval of indirect lights sampled in the at least one previous frame.

6. The apparatus of claim 4, wherein the indirect light sampling interval is a minimum sampling interval of indirect lights sampled in the at least one previous frame.

7. The apparatus of claim 1, further comprising a sampler configured to sample the indirect light of the current frame by performing rendering from a point of view of the direct light of the current frame in response to the determiner determining that the indirect light of the current frame is to be sampled, and update the indirect light sampled in the at least one previous frame as the indirect light of the current frame in response to the determiner not determining that the indirect light of the current frame is to be sampled.

8. The apparatus of claim 7, wherein the sampler is further configured to perform the sampling in parallel with a shader configured to perform shading using either one or both of the direct light and the indirect light.

9. An image processing apparatus comprising:
   a calculator configured to calculate a first difference value corresponding to a difference between frames in terms of either one or both of a position and a direction of a direct light by comparing a current frame to at least one previous frame; and
   a determiner configured to determine that at least one indirect light sampled in the at least one previous frame is to be reused as an indirect light of the current frame in response to the first difference value being less than a first threshold.

10. The apparatus of claim 9, wherein the determiner is further configured to compare, in response to the first difference value being less than the first threshold, the first difference value to an indirect light sampling interval of the at least one previous frame, and determine that the indirect light of the current frame is to be sampled in response to the first difference value being greater than or equal to the indirect light sampling interval.

11. The apparatus of claim 9, wherein the determiner is further configured to determine that the indirect light of the current frame is to be sampled, rather than reusing the at least one indirect light as the indirect light of the current frame, in response to a number of consecutive frames in which the at least one indirect light has been reused as the indirect light of the current frame being greater than or equal to a second threshold despite the first difference value being less than the first threshold.

12. The apparatus of claim 9, wherein the determiner is further configured to determine that the indirect light of the current frame is to be sampled, rather than reusing the at least one indirect light as the indirect light of the current frame, in response to a variation in shape information of an area corresponding to the position and the direction of the direct light in the at least one previous frame being greater than or equal to a third threshold despite the first difference value being less than the first threshold.

13. The apparatus of claim 12, wherein the shape information comprises information on a normal of an object surface corresponding to the area.

14. An image processing method of an image processing apparatus comprising computing hardware, the method comprising:
calculating, using the computing hardware, a first difference value corresponding to a difference between frames in terms of either one or both of a position and a direction of a direct light by comparing a current frame to at least one previous frame; and
determining, using the computing hardware, that at least one indirect light sampled in the at least one previous frame is to be reused as an indirect light of the current frame in response to the first difference value being less than a first threshold.

15. The method of claim 14, further comprising updating the indirect light sampled in the at least one previous frame as the indirect light of the current frame in response to a result of the determining being that the at least one indirect light is to be reused as the indirect light of the current frame, and sampling the indirect light of the current frame by performing rendering from a point of view of the direct light of the current frame in response to a result of the determining not being that the at least one indirect light is to be reused as the indirect light of the current frame.

16. The method of claim 14, wherein the comparing comprises comparing a first area corresponding to the position and the direction of the direct light in the at least one previous frame to a second area corresponding to the position and the direction of the direct light in the current frame; and
the first difference value comprises a non-overlapping area ratio between the first area and the second area.

17. The method of claim 14, further comprising comparing, in response to the first difference value being less than the first threshold, the first difference value to an indirect light sampling interval of the at least one previous frame, and determining that the indirect light of the current frame is to be sampled in response to the first difference value being greater than or equal to the indirect light sampling interval.

18. The method of claim 14, wherein the determining comprises determining that the indirect light of the current frame is to be sampled, rather than reusing the at least one indirect light as the indirect light of the current frame, in response to a number of consecutive frames in which the at least one indirect light has been reused as the indirect light of the current frame being greater than or equal to a second threshold despite the first difference value being less than the first threshold.

19. The method of claim 14, wherein the determining comprises determining that the indirect light of the current frame is to be sampled, rather than reusing the at least one indirect light as the indirect light of the current frame, in response to a variation in shape information of an area corresponding to the position and the direction of the direct light in the at least one previous frame being greater than or equal to a third threshold despite the first difference value being less than the first threshold.

20. A non-transitory computer-readable storage medium storing instructions to cause computing hardware to perform the method of claim 14.

* * * * *